Sept. 20, 1955 R. F. MASON 2,718,443
ENGINE PISTON
Filed July 1, 1952
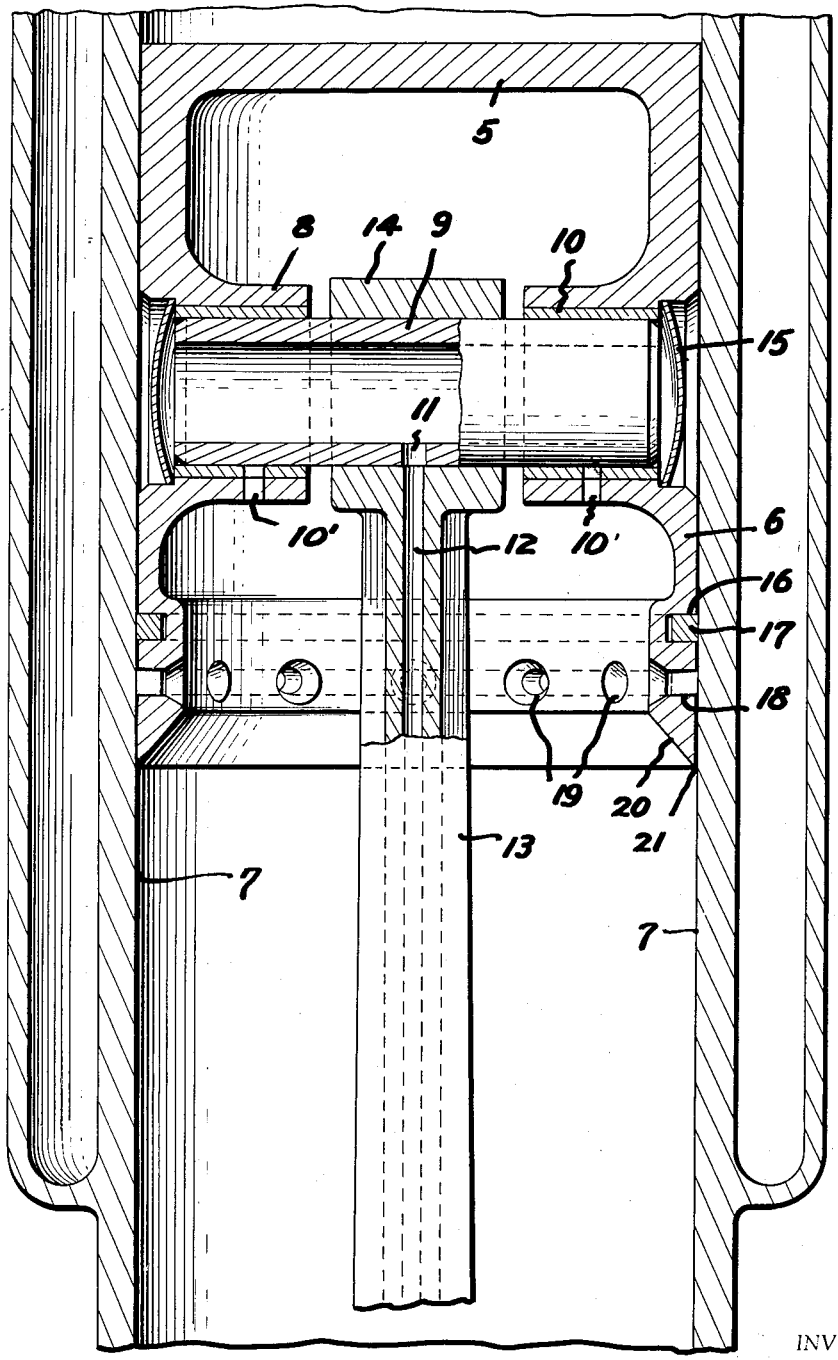
INVENTOR
Robert F. Mason
BY
ATTORNEY

United States Patent Office

2,718,443
Patented Sept. 20, 1955

2,718,443

ENGINE PISTON

Robert F. Mason, Magee, Miss.

Application July 1, 1952, Serial No. 296,559

3 Claims. (Cl. 309—8)

This invention relates to an internal combustion engine piston and the ring construction therefor with means for lubrication.

The present day type of internal combustion engine piston, of whatever material, usually includes the provision in its upper end of a plurality of annular grooves for the accommodation of the usual piston rings. In the ordinary working of the piston, lateral thrusts occur upon the piston due to its connection with the crank through the wrist pin. This lateral thrust, slight at first but increasing as wear occurs, brings about decided noise known as "piston slap," resulting in reduction in efficiency caused by compression leakage past the rings. As this wear in the internal wall of the cylinder continues, the lateral thrusts become greater, necessitating reboring or resleeving of the cylinder.

The piston of my present invention is designed to overcome these objections, and results in longer life of the piston as well as the cylinder walls as well as in a reduction of the weight of the piston. At the same time, the improved construction results in a more perfect seal between the explosion chamber and the underside of the piston, whereby the efficiency of the motor is materially increased.

The construction and arrangement of my improved piston accomplishes the foregoing advantages, and others which will appear as the description proceeds, by means of the structure shown in the accompanying drawing, wherein the single view is a longitudinal section taken through a conventional cylinder with the piston of my invention, also in section, applied therein.

The inventive idea is carried out in connection with internal combustion pistons in use at the present time and of well known construction, wherein 5 represents the head and 6 the skirt depending therefrom, to snugly fit and reciprocate within the cylinder whose walls are indicated at 7. This piston may be of cast iron or aluminum or any other approved material, and also includes the bosses 8 projecting inwardly from its side walls and intermediate the ends of the pistons for the reception of the usual wrist pin indicated at 9. The wrist pin may be mounted in the bushings 10 if desired. The wrist pin may be a solid bar of metal or may be tubular, and in instances where the splash system of lubrication is employed oil may enter the bearing through ports 10'. Where force feed of lubricant prevails, the pin will be provided intermediate its ends with a port 11 to register with a similar port or passage 12 disposed longitudinally within or upon the crank 13 whose upper end 14 encircles and snugly fits upon the wrist pin. The ends of the wrist pin 9 are enclosed by metallic plates 15 to seal the piston against passage of oil in an outward direction or pressure inwardly.

The outer surface of the skirt 6 of the piston near its lower end is provided with a circumferential channel or groove 16 preferably to receive an expansible leak-proof piston ring 17, such as is disclosed by my Patent No. 2,591,176. In instances, however, where the usual or well known non-end sealing rings are used, two or more grooves 16 are provided for the accommodation of such rings as will be understood.

In the interest of efficient lubrication the skirt 6 is provided in its exterior surface with a second circular channel 18 immediately below the channel 16 and conforming substantially thereto. Ports 19 in the piston skirt establish communication between the interior of the piston and the oil channel 18. It is to be noted that the ring channel 16 and lubrication channel 18 are positioned relatively close to one another and near the lower end of the skirt. If desired, this channel 18 may be provided with a ring similar to ring 17.

The lower edge of the skirt 6 is beveled as indicated at 20 throughout its entire circumference, this bevel extending outwardly from the inner surface of the piston skirt in a downward direction in order to provide a relatively sharp edge 21 at the juncture of the beveled surface with the exterior surface of the piston skirt.

It is common knowledge that the coolest portion of the piston is in the skirt thereof more or less remote from the head where explosions occur and heat is at the maximum. By locating the piston ring in that part of the piston most remote from excessive heat, the adverse effects due to intensive heat upon the ring is eliminated. Moreover, the location of the seal between the ring and the wall of the cylinder occurs in the coolest area of the latter, that is, in that part most remote from the explosion chamber.

If the splash system of lubrication is used, the oil is thrown from the crank case upon the internal walls of the cylinder in the zone of reciprocation of the piston skirt. It will be noted that the oil ring 18 communicates at its inner side with the interior of the piston by the flared or enlarged ports 19. As the piston reciprocates rapidly within the cylinder, a partial vacuum is created within the piston, which operates by means of the flared or enlarged ports to draw oil from the groove 18 to the interior of the piston, thus assuring an even film of lubricant between the cylinder and piston walls at all times and without the possibility of an over-accumulation of oil in that area. To further aid in the proper lubrication of the surfaces between the piston skirt and the cylinder wall, the sharp edge and beveled wall 20 are provided. As the piston travels in an upward direction, oil is thrown upon the surface of the cylinder wall, and when moving in a downward direction such oil as may be present upon those walls will be collected by the sharpened edge and will ride upon the beveled surface 20 to be thrown to the interior of the piston skirt, from whence it will pass back to the crank case. In instances where a force feed lubrication system is employed, the oil pumped through the channel 12 of the crank 13 will pass to the interior of the hollow wrist pin 9 through the port 11, from whence it passes outwardly to the ends of the wrist pin, bringing about efficient lubrication, but will be prevented by seal plates 15 from passing beyond the cylinder wall.

It will be noted that in the interest of proper construction the lower end of the piston skirt 6 is thickened where the grooves 16—18 occur, and while but a single piston ring is here shown, it will be understood that additional rings may be provided if desired.

It is well known that in the familiar type of internal combustion engine piston slap occurs at the top of the cylinder on the power stroke. As the rings on the usual piston are placed near the top of the piston, wear occurs at the top part of the cylinder. As the piston moves upwardly on the compression stroke, it has a tendency to slide to one side of the cylinder, while on the power stroke the piston has the tendency to move to the opposite side. This creates the objectionable knock or piston slap and brings about wear in the walls of the cylinder at diametrically opposite points. As this wear continues, the piston slap becomes more pronounced. The piston construction here proposed does away with wear at the top of the cylinder so that piston slap or knocking is obviated. In instances where it becomes necessary to obtain access to the piston for repair purposes, it is unnecessary in my type of construction to remove the motor head, as the piston or rings may be removed and replaced from the crank case end of the cylinder.

It will be understood that in those instances where oil is supplied under pressure, the oil will pass upwardly through the passage 12 and to the interior of the wrist pin 9 through port 11, outwardly therefrom in opposite directions to bring about a thorough lubrication between the wrist pin and the bosses and the wrist pin and the sleeve 14. The plates 15, however, act as a seal against the escape of lubrication to the interior walls of the cylinder, and also serve to prevent compression and exhaust from passing from the combustion chamber to the oil chamber. It will be understood that the oil pumped into the wrist pin will find its way between boss 8 and wrist pin 9 to lubricate these parts.

From the foregoing it will become apparent that by locating the sealing ring in that part of the piston and cylinder farthest removed from excessive heat, the efficiency of the structure and its durability are assured. It is found that with a piston so constructed, the life of the piston is lengthened, the need for frequent replacement of the piston ring is eliminated and the requirement for reboring or relining the cylinder is obviated.

I claim:

1. A piston comprising a head and a depending skirt, said head throughout the greater part of its length from its top downwardly having a smooth unbroken outer face, said skirt being thickened near its lower end and having spaced ring and lubrication channels in said thickened portion, an expansible ring in said ring channel, said thickened portion having lateral ports to establish communication between the interior of said piston and said lubrication channel, said thickened portion having a beveled surface diverging outwardly in a downward direction.

2. A piston comprising a head with a skirt depending thereon to slidably fit the walls of a cylinder, said head throughout the greater part of its length from its top downwardly having a smooth unbroken exterior face to slidably contact the cylinder walls, said skirt having a circumferential channel in its lower exterior surface near the lower end thereof, an expansion ring in said channel to frictionally engage the walls of the cylinder, said skirt having a second circumferential channel in its exterior surface adjacent to and below said ring channel, said skirt having laterally disposed ports communicating at their outer ends with the bottom of said second channel, and the walls of said ports diverging from said channel bottom to provide enlarged openings in the inner face of said piston skirt.

3. A piston comprising a head and skirt depending therefrom to slidably fit the walls of a cylinder, said head throughout the greater part of its length from its top downwardly having a smooth unbroken outer face to slidably contact the cylinder walls, said skirt wall having a circular thickened portion at its lower end, said thickened portion having a circumferential channel in its outer surface, an expansion ring in said channel to frictionally engage the walls of said cylinder, said skirt having its thickened portion also provided with a second channel in its outer surface adjacent to and below said ring channel, said thickened portion having transverse openings therein communicating at one end with the bottom of said second channel, the walls of said openings diverging from said channel bottom to provide enlarged openings in the inner face of said thickened portion, and said thickened portion having a bevelled lower face diverging in a downward direction to provide a knife edge at its juncture with the outer wall of said skirt.

References Cited in the file of this patent

UNITED STATES PATENTS

| | | |
|---|---|---|
| 1,469,656 | Lutz, Jr. | Oct. 2, 1923 |
| 1,535,069 | Weatherwax | Apr. 21, 1925 |
| 1,681,494 | Noble | Aug. 21, 1928 |
| 1,990,393 | Weller | Feb. 5, 1935 |
| 2,108,194 | Church | Feb. 15, 1938 |
| 2,110,316 | Alexandrescu | Mar. 8, 1938 |
| 2,159,989 | Hazen et al. | May 30, 1939 |
| 2,257,236 | Hayden | Sept. 30, 1941 |
| 2,410,895 | Nampa | Nov. 12, 1946 |
| 2,599,851 | Marchal et al. | June 10, 1952 |
| 2,638,391 | Heusser | May 12, 1953 |